United States Patent [19]

Muddiman

[11] Patent Number: 5,058,413
[45] Date of Patent: Oct. 22, 1991

[54] RUPTURE DISC

[76] Inventor: Robert Muddiman, 487 Speers Road, Oakville, Ontario, Canada

[21] Appl. No.: 432,860

[22] Filed: Nov. 7, 1989

[51] Int. Cl.⁵ .............................................. F22B 1/28
[52] U.S. Cl. .............................. 72/379.2; 219/121.71; 219/121.7
[58] Field of Search .................... 219/121.7, 121.71; 72/379.2

[56] References Cited

U.S. PATENT DOCUMENTS

| | | | |
|---|---|---|---|
| 3,704,807 | 12/1972 | Lidgard | 137/68.1 |
| 3,971,910 | 7/1976 | Marschalko | 219/121.7 |
| 4,046,280 | 9/1977 | Hansen | |
| 4,681,656 | 7/1987 | Byrum | 219/121.71 |
| 4,973,819 | 11/1990 | Thatcher | 219/121.7 |

FOREIGN PATENT DOCUMENTS

| | | |
|---|---|---|
| 592706 | 2/1960 | Canada |
| 635778 | 2/1962 | Canada |
| 674719 | 11/1963 | Canada |
| 696508 | 10/1964 | Canada |
| 1088285 | 10/1980 | Canada |

Primary Examiner—James G. Smith
Assistant Examiner—Jack Lavinder
Attorney, Agent, or Firm—McFadden, Fincham, Marcus & Anissimoff

[57] ABSTRACT

In a rupture disc, wherein the disc includes a central dome shaped member, there is provided an improvement by using a pattern of spaced apart small holes in the rupture disc. The pattern of holes has at least one series of aligned holes extending interiorly from the edge of the disc across the central dome shaped member. There is also disclosed a method of manufacturing the same.

1 Claim, 2 Drawing Sheets

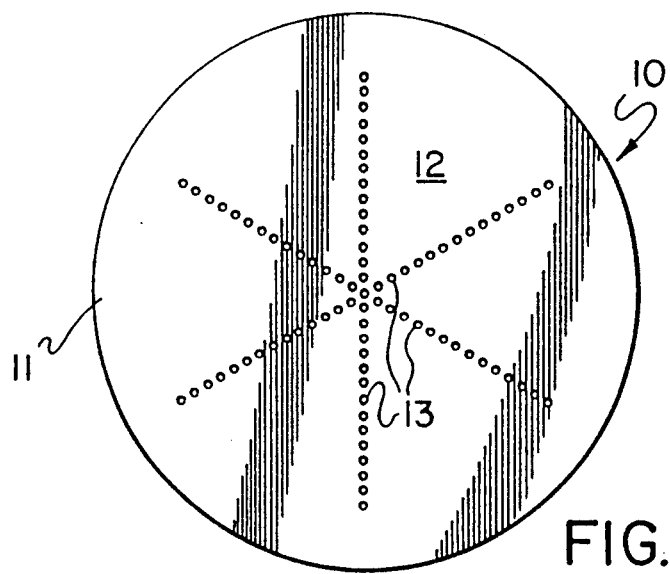
FIG. 1
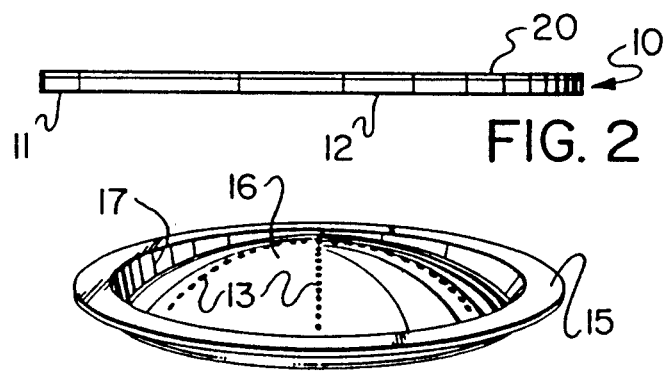
FIG. 2
FIG. 3
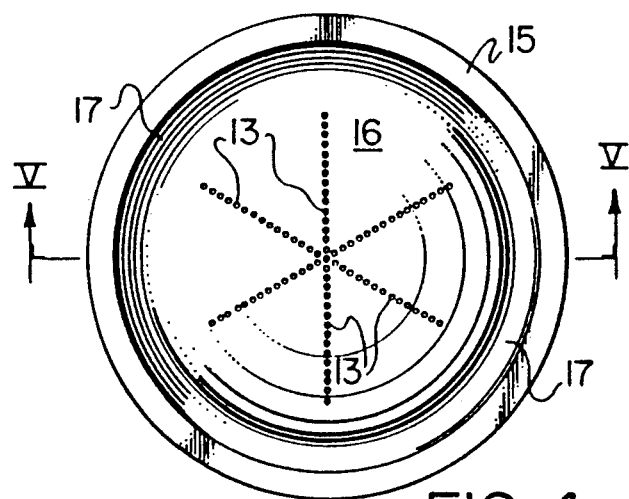
FIG. 4

RUPTURE DISC

BACKGROUND OF THE INVENTION

1. Field of the Invention

This invention relates to rupture discs and a method of manufacturing the same.

2. Description of the Related Art

One type of rupture disc that is known in the prior art is represented by Canadian Patent 674,719. In this patent, it will be seen that the rupture disc consists of two elements, a cap and a seal. The cap is made from metal that has been weakened by a plurality (usually 6) of radial slots extending from a circle of small holes near the top of the dome. The sealing member, which may be made of metal or plastic, seals the slit/slots and holes in the cap. When the pressure is applied to the seal it is transferred to the cap and the stress in the cap material between adjacent holes at the top of the slots or slits increases proportionately to the pressure until a failure occurs between two of them. This initiates complete rupture of the disc assembly. By varying the circle diameter of the holes at the top of the slits/slots, the distance between adjacent holes increases or decreases thus increasing or decreasing the strength of the material between adjacent holes and consequently the pressure at which the disc fails or ruptures. The cap material at the top of the dome within the circle diameter of small holes is not attached securely to any of the segments of the cap and, when the disc ruptures, can break free and flow downstream with the discharge. This loose part is known in the industry as a fragment and the disc is therefore a "fragmenting" type disc which is not desirable.

SUMMARY OF THE INVENTION

With the present invention the Applicant has developed a method of manufacturing which results in an improved rupture disc having more advantageous features in terms of being able to vary more precisely the pressure at which the disc ruptures and eliminating fragmentation.

More particularly, in the improved design, the Applicant has replaced the slits or slots with lines of perforations extending from points close to the edge continuously to the center of the cap. The perforations are, in fact, extremely small diameter holes that are made by a laser machine. The controls on the laser machine enable the operator to vary the diameter of every perforation and the distance between adjacent perforations by as little as 0.0001". As a result, the operator can change infinitely the strength of the cap and thus the pressure at which it will rupture. In this way, the improved design and improved method of manufacture (use of a laser machine) enables the Applicant to eliminate the "manufacturing tolerance" which is necessary using the prior art. Also, when the exact combination of perforation diameter and distance between perforations to produce a desired rupture pressure has been found, the laser machine, without further adjustment, will repeat this precisely as many times as required. Thus, the Applicant can produce any number of rupture discs which will be identical to each other. This is almost impossible to do by any other means.

In the present invention, because the lines of perforations extend to the centre of the disc there is no resulting small portion or fragment of the cap which may become detached during the rupturing process. Consequently, this is a "non-fragmenting" design.

As the pressure rises, in the design of the present invention, the tensile stress in the cap is resisted by the material between hundreds of holes instead of the material between just 6 holes in the cap of the prior art. Accordingly, the total area of material resisting the stress is far greater. Because of this, the cap of the improved design may be stressed to a higher percentage of its ultimate strength without affecting its performance. In other words, it may be exposed to a higher percentage of its rupture pressure. More particularly, the rupture disc of this invention may be used in systems where the working pressure is up to 90% of its rupture pressure without affecting its useful life. This is a major improvement over discs made using the prior art.

This method of manufacturing may be applied to any shape of disc including round, square and rectangular and in any form including flat or domed. Also, this method may be used with any seat design including flat and angle.

With the present invention, Applicant has developed an improved rupture disc, having more advantageous features in terms of being able to vary the pressure at which the rupture disc is intended to rupture, and as well, a method of manufacturing such discs.

More particularly, in accordance with one aspect of this invention there is provided an improvement in a rupture disc, in which the disc includes a central dome shaped member, in which said improvement comprises providing a pattern of spaced apart small holes, said pattern of holes comprising at least one series of aligned holes extending interiorly from the edge of said disc across said central dome shaped member.

In accordance with another aspect of the present invention there is provided a method of forming a rupture disc comprising the steps of providing a non-apertured rupture disc having a central dome shaped member, and forming a series of aligned holes extending interiorly from the edge of said disc across said dome shaped member by subjecting said disc to a series of laser cutting operations to form individual holes.

In accordance with a further aspect of the present invention there is provided, in combination, a rupture disc comprising a central dome shaped member, a pattern of spaced apart small holes in the rupture disc, the pattern of holes comprising at least one series of aligned holes extending interiorly from the edge of the disc across the central dome shaped member, together with a backing adapted to prevent passage of fluids through the holes.

In accordance with still a further embodiment of the present invention there is provided a method of forming a rupture disc blank comprising: providing a length of material suitable for forming a rupture disc blank, effecting relative movement between a laser beam source and the blank, and creating holes in a series of spaced apart apertures extending between opposed surfaces of the blank using laser beam.

In greater detail of the present invention, it has been found that the conventional manner of providing a rupture disc need not include slits or slots but rather, the rupturing capability of the disc can be provided by a series or plurality of spaced apart individual small holes whereby the initiating of the rupture may occur between any pair of adjacent holes rather than only at the end of the slits or slots which are provided with holes.

To this end, according to preferred embodiments of the invention, a rupture disc comprises a series of intersecting lines each comprised of a plurality of individual spaced apart small holes, and in which the lines of holes preferably extend inwardly from the peripheral edge of the rupture disc and intersect in the central area of the dome shaped member.

In a particularly preferred form of the rupture disc, the spacing of adjacent holes is preferably between about 0.001 inches to about 0.100 inches, more desirably between about 0.004 to about 0.040 inches. It is particularly preferred that adjacent holes are equidistantly spaced apart, as this will permit rupture initiation to take place between any two adjacent holes.

For most practical purposes, relative to the more common types of rupture discs, the individual holes will have a largest dimension of approximately, 0.003 inches to 0.008 inches, and most desirably between about 0.004 to about 0.006 inches. In a preferred form the holes are most desirably of a circular configuration but it will be understood that for different applications, the geometric configuration can vary while still maintaining the concept of a small opening or hole.

In a particularly preferred form of rupture disc, the disc is formed from a material having a thickness of between about 0.001 to about 0.064 inches, and most desirably from a material having a thickness of between about 0.001 to about 0.018 inches. The rupture disc can be formed of any suitable material well known to those skilled in this art and which will vary depending on the nature of the use of the rupture disc. Typically, such materials include various types of steel and steel alloys, aluminum and other non-ferrous metals or alloys, etc.

It is a preferred feature of the present invention that the plurality lines of holes comprises two intersecting lines of holes, and most preferably three intersecting lines of holes. In this arrangement, it is a particularly preferred feature that the lines of holes are substantially straight lines which intersect centrally of the dome, although other configurations can be used if desired.

Various methods may be employed to seal the holes in the cap material made by the laser machine. These would include a lining made from a film of plastic material such as Teflon or a thin film of any metal, a coating of plastic or other material, or a coating applied by electroplating, electroless plating or chemical grafting. If pressure is to be applied against the concave side of the disc, the holes must be sealed on the concave side. Conversely, if pressure is to be applied to the convex side the holes must be sealed on the convex side. If pressure is to be applied to both sides, the holes must be sealed on both sides.

In the method of the present invention, as described above, preferred aspects include those wherein the non-apertured rupture disc is provided by deforming a sheet of material to provide a pre-bulged rupture disc, and subjecting the pre-bulged rupture disc to the action of a laser to create a plurality of spaced apart holes therein by rotating the laser and/or the rupture disc, one relative to another.

Another preferred aspect of the method includes those wherein the laser is rotated and which comprises generating a laser beam to burn a hole in said rupture disc, ceasing generation of the laser beam, rotating the laser and/or rupture disc, generating a further laser beam at a location spaced apart from the hole previously formed, and repeating such sequence until a desired pattern of holes have been formed in said rupture disc.

The improved rupture disc of the present invention has the advantage that by varying the size of the holes and the distance between adjacent holes, a disc can be custom tailored to meet different requirements for rupture pressure by a simple expedient whereby it will rupture at a desired pressure.

The rupture discs of the present invention, in their preferred form, where the lines of perforations are located uniformly across the surface of the disc, will permit failure to occur between adjacent perforations instead of merely between two circular apertures located at the ends of slits as in the prior art, which results in a much more consistent performance.

In addition, since the lines of perforations extend across the rupture disc in preferred embodiments, there is no small portion of the disc (i.e. the material inside the circle of the holes) which can tear off and potentially cause downstream damage after rupture—i.e. the rupture disc of the present invention is a non-fragmenting type.

Likewise, because of the nature of the structure of the present invention, it is now possible to use heavier material which can be pre-bulged or preformed to a higher pressure whereby a maximum allowable working pressure greater than that associated with conventional rupture discs can now be provided. Thus, compared to conventional arrangements such as those referred to above, where for example 6 holes form the termination point of 6 slots, the stress is thus shared in a conventional structure by only the six holes whereas in the present instance, the stress is thus shared between the very large number of holes as between adjacent holes.

The present invention provides a rupture disc that will work at a pressure much closer to its rupture pressure than rupture discs made according to conventional techniques and thus, the rupture discs of the present invention have a wider range of application than those of the prior art.

Still further, with respect to the method, use of a laser permits the size of the holes and the distance between adjacent holes to be varied infinitely so that rupture discs can be produced which will rupture precisely at a desired pressure. Likewise, in using a laser to form the holes, the distance between adjacent holes can be reduced to a very small increment, i.e. substantially zero, so that rupture discs can be formed where they are designed to burst at very low pressures, which was previously impossible using conventional technology.

It is known to those skilled in the art that, when pressure is applied to the convex side of material formed in a dome, the dome will collapse at a pressure far below that at which the material would rupture if pressure was applied to the concave side. Further, when the dome collapses, the material will move through the flat or neutral position and reform in a dome shape with the concave side facing the pressure. If the pressure that caused the collapse does not rise significantly higher, the disc material in its new (reverse) shape will hold or contain it.

If the applied pressure is from a compressible fluid (gas), the reversal shape of the material from convex to concave will take place in a period of time that can be measured only in microseconds. As a result, considerable kinetic energy develops in the material during reversal which produces a momentary increase in the tensile stress in the material. This stress is easily resisted if the material is solid.

If the holes in the cap of the disc of the present invention are sealed against pressure applied from the convex side and pressure is applied to the convex side, the material of the cap will react as described above. However, because the material in the cap of the disc of this invention has been weakened by the lines of perforations, the cap will fail along these lines during reversal. Thus, the design and method of manufacture described in this application can be used for both forward acting (tension loaded) and reverse acting (compression loaded) rupture discs.

Having thus generally described the invention, reference will now be made to the accompanying drawings, illustrating preferred embodiments, and in which:

BRIEF DESCRIPTION OF THE DRAWINGS

FIG. 1 is a top plan view of one form of rupture disc in accordance with the invention;

FIG. 2 is side view of the disc in FIG. 1;

FIG. 3 is a perspective top view of another form of rupture disc in accordance with the invention;

FIG. 4 is a bottom plan view of the disc of FIG. 3;

DESCRIPTION OF PREFERRED EMBODIMENTS

Figure 6:
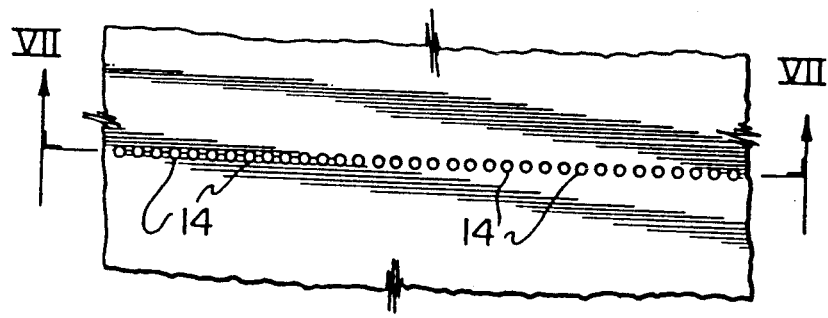
FIG. 6 is a part plan view of one part of a weakness pattern, to a larger scale, as in FIG. 1.
Figure 7:
FIG. 7 is a cross-section on the line 7—7 of FIG. 6.

Illustrated in FIGS. 1 and 2 is an embodiment of the invention, the rupture disc 10 comprising a flat disc, of metal, having a peripheral flange portion 11 and a central portion 12. The central portion has a pattern of weakness formed, in the example illustrated, by a series of radial lines 13, each line composed of a plurality of very small holes 14, seen more clearly in FIGS. 6 and 7. The lines extend continuously across the central portion 12, and the holes are evenly spaced, i.e. uniformly positioned along the lines.

Figure 5:
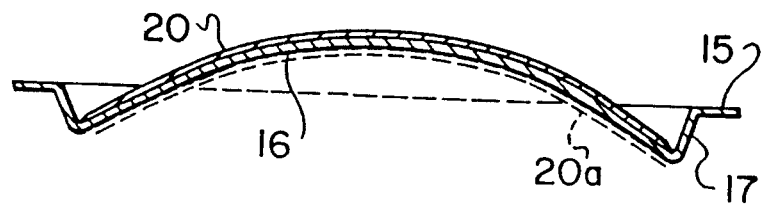
FIG. 5 is a cross-section on the line 5—5 of FIG. 4.

In another embodiment, as illustrated in FIGS. 3, 4 and 5, a rupture disc comprises an annular flange 15 and a central domed portion 16. In the example, the domed portion 16 is joined to the flange 15 by a frustoconical portion 17. The disc is formed from a flat metal disc, the domed portion 16 being stressed beyond the normal yield stress during forming.

After forming into the final form, a pattern of weakness is formed in the domed portion 16. In the example illustrated, as in FIGS. 1 and 2, the pattern is in the form of radial lines 13, each line extending right across and comprising a plurality of evenly spaced small holes 14, as in FIG. 1, seen more clearly in FIGS. 6 and 7.

The size and spacing of the holes can vary depending on the size of the disc and the desired rupture pressure. A preferred size for the holes is about 0.002" to 0.003" and the distance between holes can vary quite considerably, for example from about 0.007/0.008" to about 0.040", center to center, but as mentioned above, the holes can be very close together, substantially touching, for example from about 0.001" clearance between adjacent holes.

The holes 14 are formed by laser drilling, either the laster can be moved over the disc, or the disc can be moved. For the embodiment in FIGS. 3, 4 and 5, either the laser, or the disc is moved in an arc, so that the laser drills the holes normal to the surface of the domed portion. One form of laser is a $CO_2$ laser. The laser can operate in a continuous mode or a pulsed mode for each hole. The holes 14, while shown as round holes, which are very convenient to form, can be of other shapes, such as squares, elongate and the like.

After the holes have been formed, the central portion 12 or 16 has a layer 20 applied. In the example of FIGS. 3, 4 and 5, the layer is applied to the convex surface of the domed portion. The layer 20 can also extend over the flange or peripheral portion 11 or 15. This is particularly applicable if the layer is applied by dipping, or spraying. An alternative way of applying layer 20 is by the use of a thin film or foil of material. This can be bonded to the surface of the central portion by a self-adhesive characteristic, possibly under heat and pressure, or by use of a bonding agent.

In an alternative arrangement, the layer 20 can be on both surfaces, or on the concave surface, depending upon the intended use. This is indicated at 20d in dotted outline, in FIG. 5.

The objective of the layer 20 is to seal the small holes 14. A variety of materials can be used for layer 20. Flexible or semi-flexible synthetic resin materials, such as "Teflon" (trade mark) and other similar materials can be used. Alternatively, nickel, tantalum and other metals can be used, applied by plating or spraying, for example. The layer is applied either on the surface which is opposed to the pressure or on both surfaces.

While other patterns of weakness can be used, radial lines are usually preferred as when the discs rupture, the central portion tears along the lines, to the center and then bends back, similar to a series of petals, and creates a minimum restriction of flow through the disc.

Because of the uniformly perforated pattern of the holes, and with the very accurate sizing and spacing, heavier, that is thicker, or stronger, material can be used. Thus heavier material, in a domed form of disc, can be pre-bulged to a higher pressure. This enables the maximum allowable working pressure to be increased, which is a considerable advantage.

A flat disc, of the form in FIGS. 1 and 2, can be used for liquids. Once the stated maximum pressure is exceeded, the disc starts to tear along the lines 13 and will continue to rupture, even though some pressure reduction may occur. The disc eventually bursts open, the segments folding back.

In manufacture, discs are usually made in batches, with several batches of differing characteristics being made at the same time. It is possible to program the laser control system so that an identifying code is scribed into each disc.

While in the example illustrated in FIGS. 3, 4 and 5, the domed portion 12 is connected to the flange 11 by frustoconical portion 13, the domed portion can be directly connected to the flange. That is, the domed portion is formed by passing out of a flat plate, extending entirely to one side of the plane of the flange.

The embodiment illustrated in FIGS. 1 and 2 can be installed with a layer 20, the layer 20 is applied to the surface of the disc which opposes the pressure. In a flat disc, as in FIGS. 1 and 2, which could be installed in either direction, normally the layer would be applied on both surfaces, to avoid having to check the correct way of installation, and to avoid errors.

EXAMPLE I

Two identical conventional rupture discs were made using the slitting technique known in the prior art.

The material of the cap was stainless steel alloy 316 having a thickness of 0.004" and a rupture pressure of 350 psig. This was pre-bulged to a pressure of 230 psig after which, 6 slits/slots were cut in lines 60 degrees apart from each other and terminating in small holes at the top of the dome forming a ⅜ inch diameter circle. The slits/slots were sealed by a 0.002" thick film of Teflon. One of the discs (cap and seal) was mounted in a disc holder and subjected to increasing pressure until it burst. It ruptured at 95 psig at 70 deg. F.

The other disc was mounted in a disc holder and installed in a test fixture. The test fixture was connected to a source of pressure and a pressure plus temperature recording chart. Pressure alternating between 33 and 86 psig 16 times a minute (86 psig is 90% of the rupture pressure of the disc). Psig was admitted to the test fixture until the disc ruptured. After 2,494 cycles, the disc failed at 86 psig.

EXAMPLE II

Two new discs of the same size as those in Example I were made using the new technique described in this application. However, cap material of half the thickness (0.002") was used. In this case, the rupture pressure of the cap material was 170 psig and the pre-bulged pressure was 130 psig.

Instead of being slit, the prebulged material was perforated using a laser machine. Three continuous straight lines of perforations were made from points near one edge of the material extending across the center of the dome to the other side. The size of the perforations or holes was about 0.006" and the distance between each pair of adjacent holes was about 0.025".

One of the caps was mounted in a disc holder with a 0.002" thick Teflon seal and subjected to increasing pressure until it burst. The rupture pressure was recorded at 115 psig at 70 deg. F. The other disc was installed in the test fixture as in Example I and exposed to pressure which fluctuated between 46 and 103 psig 16 times a minute (103 psig is 90% of the rupture pressure of the disc). After 16,760 cycles, the disc failed at 103 psig.

Rupture discs made using the prior art were never recommended for commercial use in systems where the operating pressure was above 80% of the rupture pressure because the expected useful life of the disc was limited. In Example I, the disc was exposed to 90% of its rupture pressure and it failed after just 2,494 cycles which proves the point. However, the test described in Example II show that discs made using the improved technique of the present invention lasted nearly 7 times longer, even though the material thickness was half. Accordingly, discs of the improved design of the present invention may be used in applications where discs of the prior design may not, i.e. where the system pressure is up to 90% of the rupture pressure. Thus, discs of the present invention have a wider range of application.

I claim:

1. In a method of forming a rupture disc, the improvement comprising the steps of:

deforming a sheet of material to provide a pre-bulged rupture disc having a central dome shaped member;

forming a series of individually aligned holes extending interiorly from the edge of said disc across said dome shaped member by subjecting said disc to a series of laser cutting operations to form said individual holes wherein said laser cutting operations comprise rotating a laser, generating a laser beam to burn a hole in said rupture disc, ceasing generation of the laser beam, rotating the laser, generating a further laser beam at a location spaced apart from the hole previously formed, and repeating such sequence until a desired pattern of holes have been formed in said rupture disc.

* * * * *

UNITED STATES PATENT AND TRADEMARK OFFICE
CERTIFICATE OF CORRECTION

PATENT NO. : 5,058,413
DATED : Oct. 22, 1991
INVENTOR(S) : Robert Muddiman

It is certified that error appears in the above-identified patent and that said Letters Patent is hereby corrected as shown below:

On the title page, Item

[30]     Foreign Application Priority Date
  Oct. 16, 1989 [CA] Canada........................ 2,000,755

Signed and Sealed this

Ninth Day of March, 1993

Attest:

STEPHEN G. KUNIN

Attesting Officer

Acting Commissioner of Patents and Trademarks